United States Patent [19]

Hou

[11] Patent Number: 5,007,724
[45] Date of Patent: Apr. 16, 1991

[54] AUXILIARY MIRROR ANGLE CHANGING DEVICE FOR A MAIN AND AUXILIARY REARVIEW MIRROR

[76] Inventor: Mei-Wen H. Hou, No. 200, Fu-Chiang Road, Sec. 2, Yung Kang Shiang, Tainan Hsien, Taiwan

[21] Appl. No.: 530,322

[22] Filed: May 30, 1990

[51] Int. Cl.⁵ .............................................. G02B 7/18
[52] U.S. Cl. .................................. 350/604; 350/636; 350/637
[58] Field of Search ............... 350/604, 632, 634, 636, 350/637; 248/483, 485

[56] References Cited

U.S. PATENT DOCUMENTS

| | | | |
|---|---|---|---|
| 4,268,120 | 5/1981 | Jitsumori | 248/483 |
| 4,921,337 | 5/1990 | Hou | 350/632 |
| 4,936,670 | 6/1990 | Yoo | 350/604 |

Primary Examiner—Bruce Y. Arnold
Assistant Examiner—J. P. Ryan
Attorney, Agent, or Firm—Morton J. Rosenberg; David I. Klein

[57] ABSTRACT

An auxiliary mirror angle changing device comprising an auxiliary mirror frame sidewise extensible from the inside to the outside of a main mirror frame and a control electric circuit and a digital motor controlled by said circuit to rotate clockwise or counterclockwise actuated by a switch to incline the auxiliary mirror frame to an angle wanted.

1 Claim, 5 Drawing Sheets

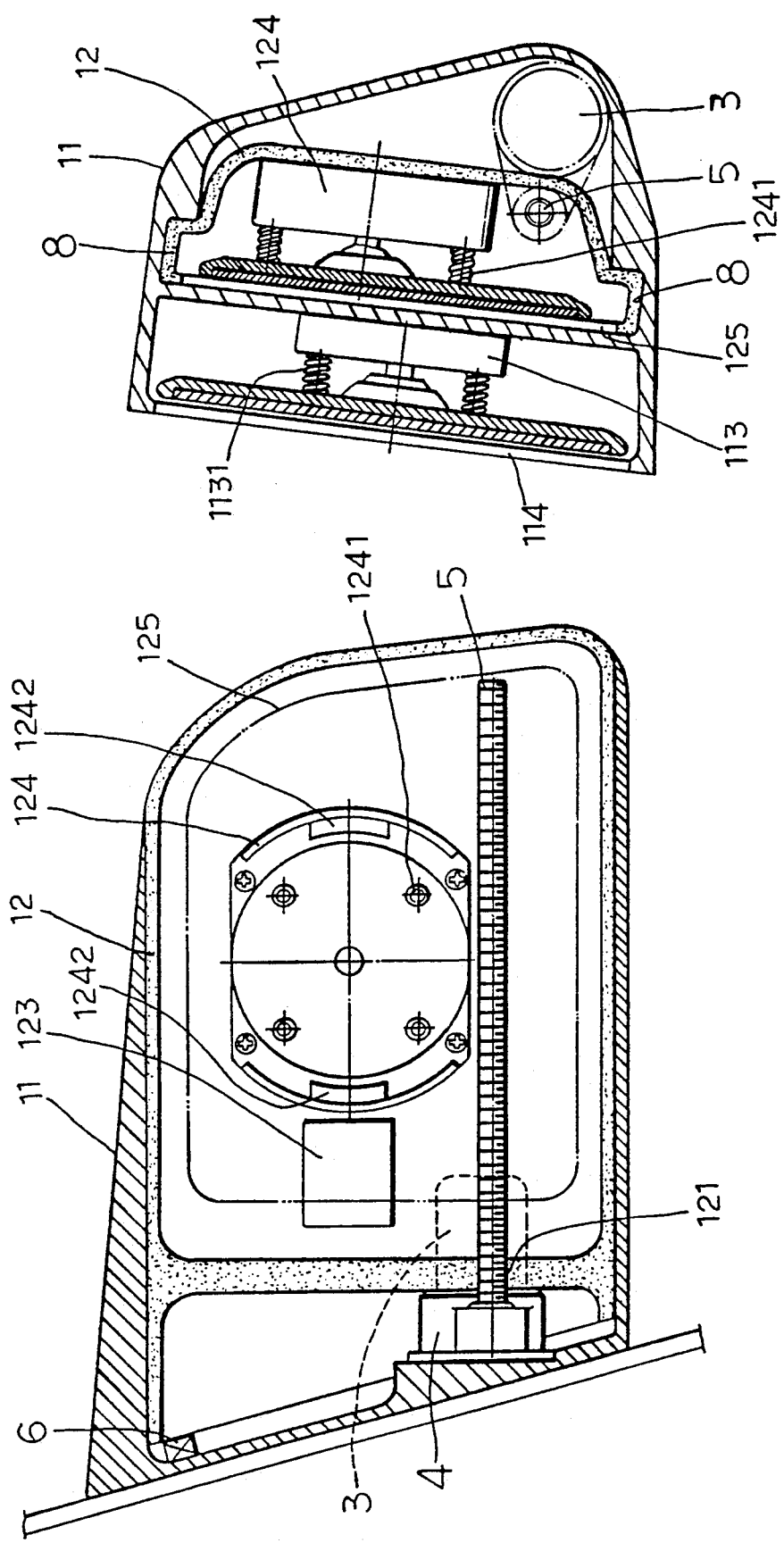

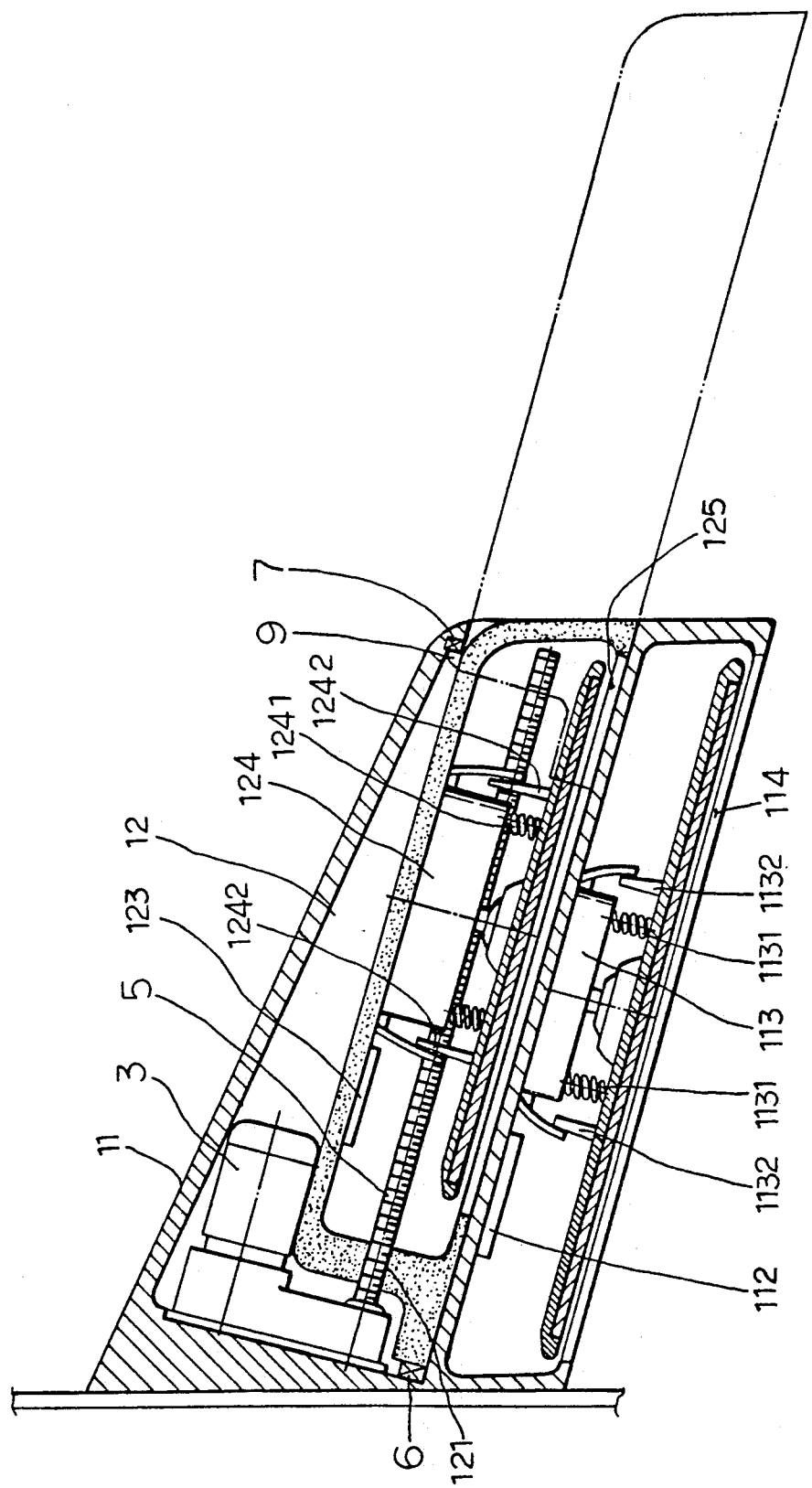

AUXILIARY MIRROR ANGLE CHANGING DEVICE FOR A MAIN AND AUXILIARY REARVIEW MIRROR

BACKGROUND OF THE INVENTION

This invention aims to improve conventional main and auxiliary rearview mirror so that the auxiliary rearview mirror can be adjusted in its angle for viewing the rear of a car.

SUMMARY OF THE INVENTION

The auxiliary mirror angle changing device for a main and auxiliary rearview mirror in the present invention comprises a main mirror frame, an auxiliary mirror frame, a control electric circuit and a digital motor for changing the angle of the auxiliary mirror frame as the main components.

When the auxiliary mirror frame is moved sidewise out of or in the main mirror frame, one of two micro switches fixed at the front end or the rear end of the main mirror frame is touched and actuated by one of two touch blocks of the auxiliary mirror frame to stop a motor rotating a reduction gear set connected with a worm to move said auxiliary mirror frame out or in. When the auxiliary mirror frame has been moved out of the main mirror frame and the front micro switch has been touched by the touch block, the control circuit for changing the angle of the auxiliary mirror frame can get a bias signal to become on.

The auxiliary mirror frame normally stays inside the main mirror frame and can be moved sidewise out of the main mirror frame by the motor rotating the reduction gear set and the worm connected with said gear set, as the worm inserts and engages in a threaded hole in the rear end wall of the auxiliary mirror frame.

The control electric circuit for changing the angle of the auxiliary mirror frame consists of components connected as in a diagram shown in FIG. 5 to rotate the digital motor clockwise or counterclockwise by actuating a circuit switch. Then, the digital motor can make a base connected with its shaft incline backward or forward to press a plurality of springs fixed between the base and the rear surface of the auxiliary mirror so that the auxiliary mirror can be inclined to a certain angle wanted when a driver presses up or down and releases the circuit switch.

BRIEF DESCRIPTION OF THE DRAWINGS

FIG. 2 is an elevational cross-sectional view of the main and auxiliary rearview mirror in the present invention.

FIG. 3 is a side cross-sectional view of the main and auxiliary rearview mirror in the present invention.

FIG. 4 is an upside cross-sectional view of the main and auxiliary rearview mirror in the present invention.

DETAILED DESCRIPTION OF THE INVENTION

Figure 1:
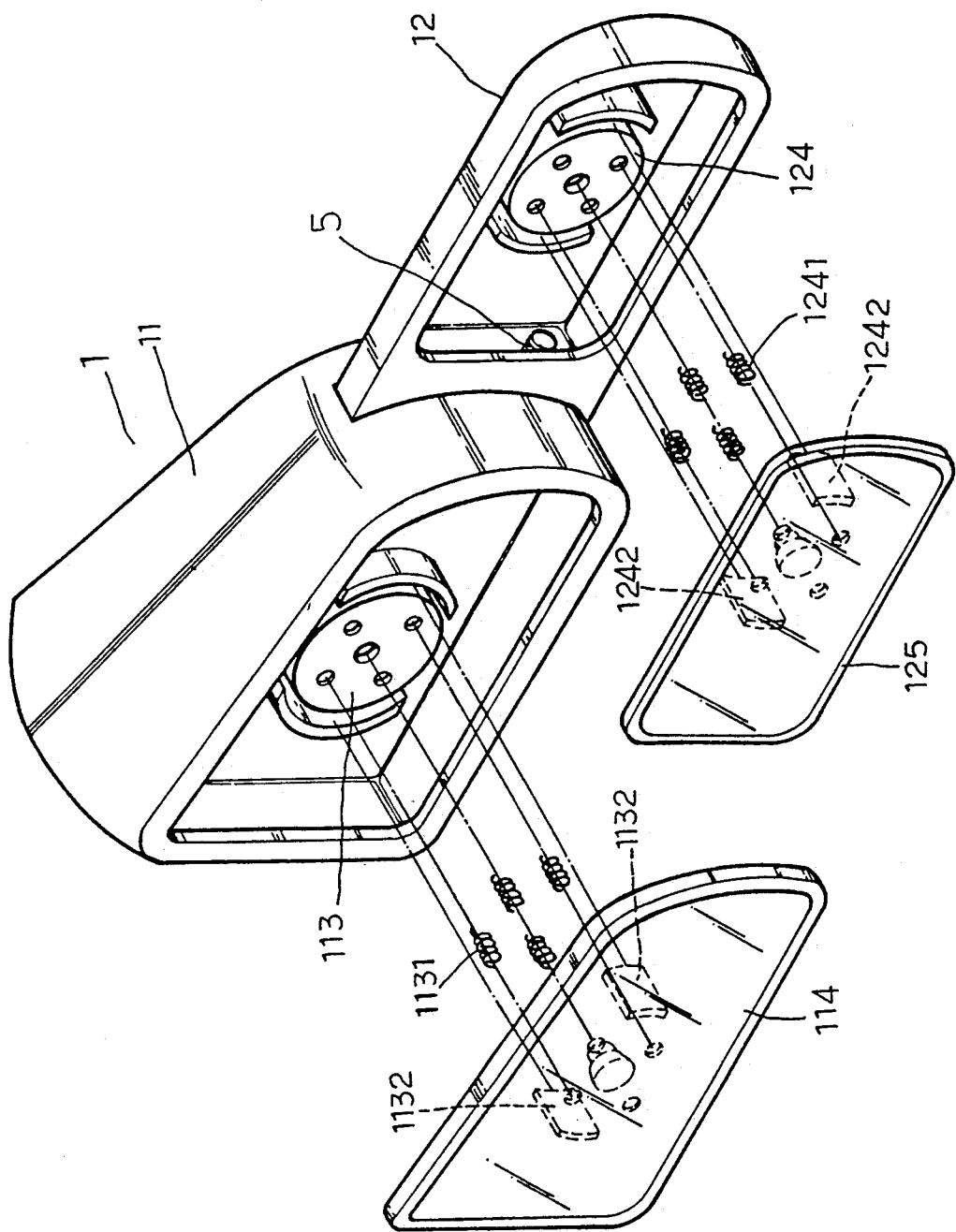
FIG. 1 is an exploded perspective view of the main and auxiliary rearview mirror in the present invention.

The auxiliary mirror angle changing device in the present invention comprises a mirror frame 1, a motor 3, a reduction gear set 4 and a worm 5, a control electric circuit 112 for controlling a digital motor 111 for inclining the main mirror frame, a control electric circuit 123 for controlling a digital motor 122 for inclining the auxiliary mirror frame as the main components.

The mirror frame 1 includes a main mirror frame 11 and an auxiliary mirror frame 12 set inside the main mirror frame 11.

The motor 3 is mounted in the mirror frame 1, connected with a reduction gear set 4, which is then connected with one end of a long worm 5 for rotating said worm 5. The worm 5 engages with a threaded hole 121 in the rear end of the auxiliary mirror frame 12 so that said frame 12 can be moved back and forth to extend out of or in the main mirror frame 11 by rotation of the worm 5.

The main mirror frame 11 contains a digital motor 111 not shown in the Figures connected with the control circuit 112 and having its shaft connected with a base 113, in which said motor 111 is mounted. A plurality of springs 1131 and two opposite guide blocks 1132 are fixed on the rear surface of the main mirror 114 and insert in the surface of the base 113.

Figure 5:
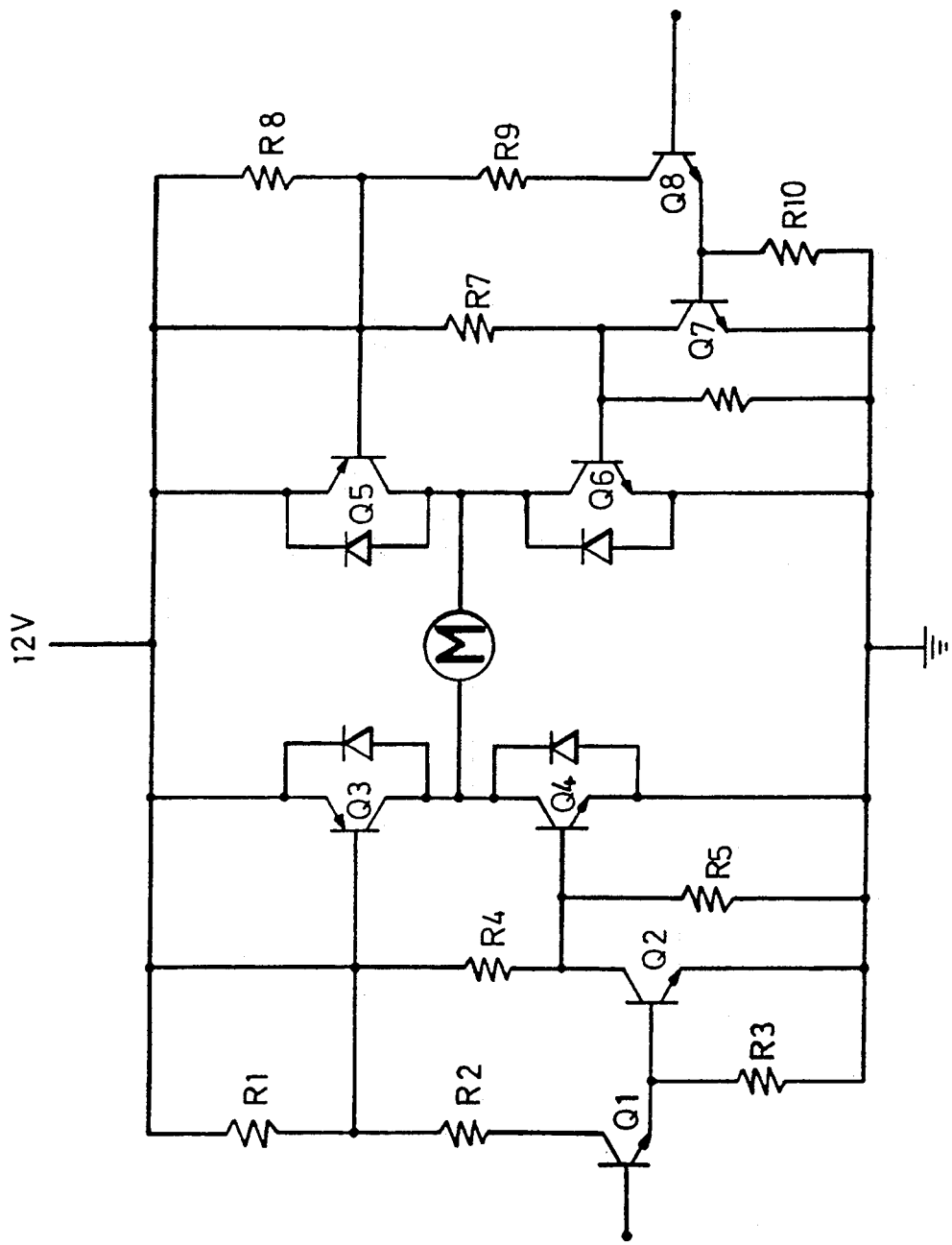
FIG. 5 is the diagram of the electric circuit for inclining the angle of the auxiliary mirror or the main mirror in the present invention.
Figure 6:
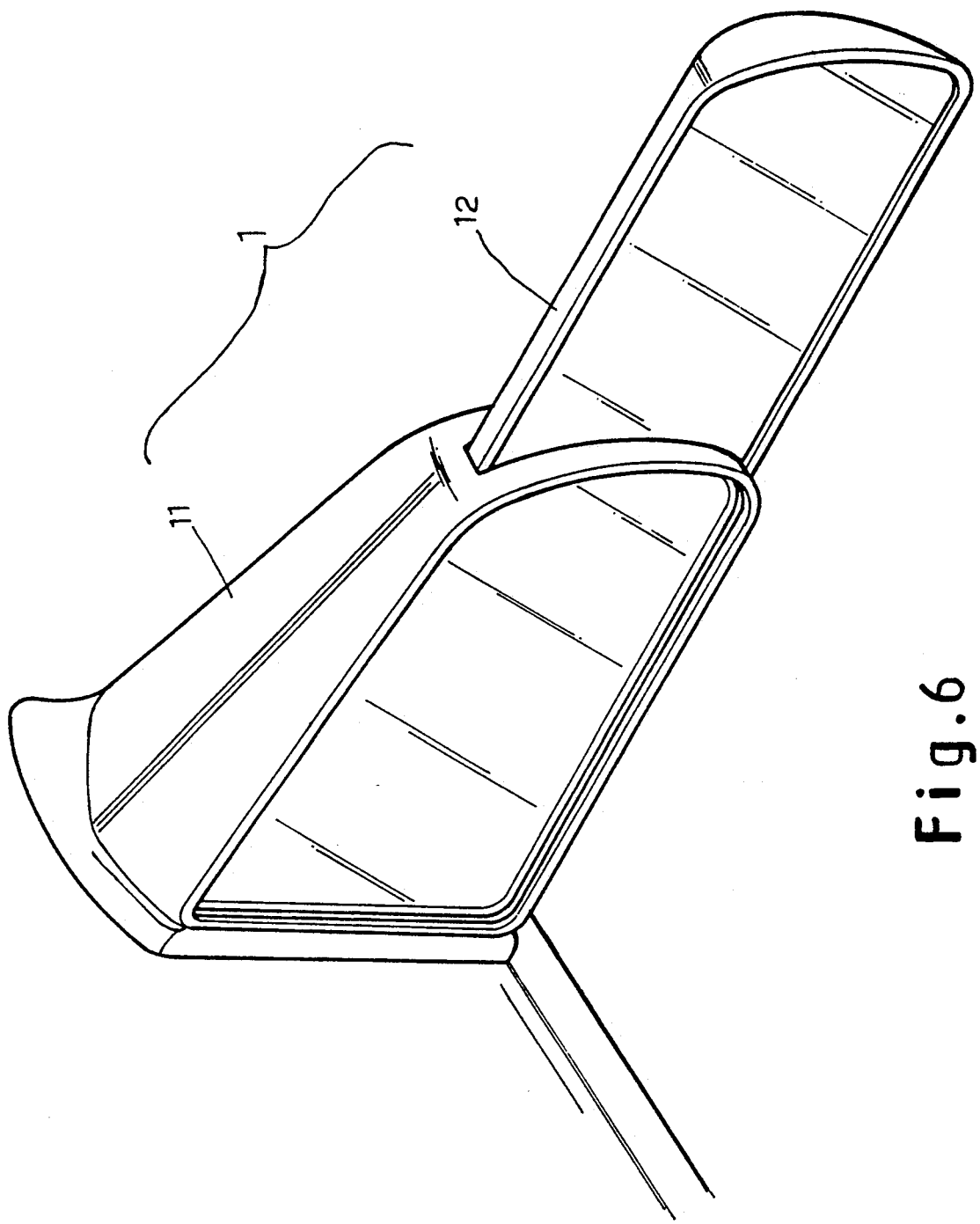
FIG. 6 is a perspective view of the main and auxiliary rearview mirror in the present invention.

The electric circuit 112 for changing the angle of the main mirror frame 11 has its components connected as shown in a diagram in FIG. 5 consisting of four transistors Q3–Q6 for preventing minus current caused by stoppage of the motor 111 lest those transistors should be broken. In addition, the transistors Q3 and Q5 are PNP ones so as to make the motor 111 unmistakably grounded by means of resistances R4 and R5 before the transistors Q4 and Q6 receives an actuating signal. When a driver pushes up the circuit switch, the potential of the transistor Q3 is lowered by Q1 to get through to actuate the transistor Q2, then which lowers the potential of the transistor Q4 to be stopped. Then the current flows from the transistor Q3 to the motor 111 and then to the transistor Q6. Thus, the motor 111 is energized to rotate clockwise. But, when the driver pushes the circuit switch down, the transistor Q8 is first actuated, to start Q5 and Q7 stopping Q6 so that the current flows through Q5, the motor 111 and Q4, and thus the motor 111 rotates counterclockwise. Then the base 113 can be inclined backward or forward to a certain angle according to the clockwise or counterclockwise rotation of the motor 111, and thus the main mirror can be inclined to the same angle as the base 113 through the springs 1131.

The auxiliary mirror frame 12 is provided with two touch blocks 9 at the upper and the lower edge of the rear end and two micro switches 6 and 7 can be touched and actuated by the touch blocks 9 to cut off the power to the motor 3 to stop it, when the auxiliary mirror frame 12 is moved out of or in the main mirror frame 11. And the control circuit 123 can also receive a bias to become on.

The control electric circuit 123 for inclining the auxiliary mirror frame 12 has the same components as the control electric circuit 112 does as shown in FIG. 5.

How to use the auxiliary mirror frame 12 is to be described now. At first, a driver pushes up or down the switch to start the motor 3, which will then rotate clockwise or counterclockwise the reduction gear set 4 and then the worm 5. Thus the auxiliary mirror frame 12 can be moved out of the interior of the main mirror frame 11 by rotation of the worm 5 until one of the touch block 9 touches the micro switch 7 to stop the motor 3 letting the auxiliary mirror frame 12 to stay put sidewise outside the main mirror frame 11, and the control circuit 123 can also be started by a bias. Then the driver then pushes up or down the control circuit switch to rotate the motor 122 clockwise or counterclockwise, which then inclines the base 14 backward or forward to press the springs 1241 so that the auxiliary mirror 125 may be inclined to a certain angle as wanted backward or forward till the driver releases the circuit switch. Then the auxiliary mirror frame 12 has been inclined to the angle wanted.

The theory of inclining both the main or the auxiliary mirror frame 11 or 12 is quite the same, operated by a separate control circuit and a separate digital motor having the same components as connected as the same diagram shown in FIG. 5, actuated by a separate control switch.

What is claimed is:

1. An auxiliary mirror angle changing device for a main and auxiliary rearview mirror comprising;
   a main mirror frame;
   an auxiliary mirror frame normally being moved in the interior of the main mirror frame and possible to be moved sidewise out of the main mirror frame by a motor connected with a reduction gear set to rotate a worm inserting and engaging in a threaded hole in the rear end wall of the auxiliary mirror frame, said motor being started by a switch and stopped by one of two micro switches fixed respectively at the front end and the rear end of the main mirror frame, said micro switch being actuated by touching of one of two touch blocks provided on and under the rear end wall of the auxiliary mirror frame, said auxiliary mirror frame possible to be inclined in its angle by a device comprising;
   a digital motor mounted in said auxiliary mirror frame;
   a control electric circuit having its output connected with the digital motor for rotating the digital motor clockwise or counterclockwise and connected with the micro switches which can start said control electric circuit when it is touched by one of the touch block; and
   a base connected with the shaft of the digital motor enveloping said motor in its interior and being inclined backward or forward by clockwise or counterclockwise rotation of the digital motor to press a plurality of springs fixed on the back of the auxiliary mirror to incline said mirror to a certain angle wanted by pushing up or down a control switch.

* * * * *